(12) United States Patent
Schollhammer et al.

(10) Patent No.: US 11,351,846 B2
(45) Date of Patent: Jun. 7, 2022

(54) LOCK SYSTEM FOR A ROLL COVER

(71) Applicant: Oakmoore Pty Ltd, Salisbury (AU)

(72) Inventors: Wolfgang Schollhammer, Salisbury (AU); Nathan Basford, Salisbury (AU)

(73) Assignee: OAKMOORE PTY LTD, Salisbury (AU)

( * ) Notice: Subject to any disclaimer, the term of this patent is extended or adjusted under 35 U.S.C. 154(b) by 0 days.

(21) Appl. No.: 17/058,344

(22) PCT Filed: May 22, 2019

(86) PCT No.: PCT/AU2019/050499
§ 371 (c)(1),
(2) Date: Nov. 24, 2020

(87) PCT Pub. No.: WO2019/227136
PCT Pub. Date: Dec. 5, 2019

(65) Prior Publication Data
US 2021/0094396 A1    Apr. 1, 2021

(30) Foreign Application Priority Data

May 31, 2018  (AU) .............................. 2018901955

(51) Int. Cl.
*B60J 7/185* (2006.01)
*B60J 7/06* (2006.01)
*B60J 7/19* (2006.01)

(52) U.S. Cl.
CPC .............. *B60J 7/185* (2013.01); *B60J 7/068* (2013.01); *B60J 7/198* (2013.01)

(58) Field of Classification Search
CPC ..... B60J 7/085; B60J 7/10; B60J 7/198; B60J 7/141; B60J 7/068

USPC .............................................. 296/68, 100.09
See application file for complete search history.

(56) References Cited

U.S. PATENT DOCUMENTS

| 4,892,338 A * | 1/1990 | Weinerman ............ E05C 9/046 |
| | | 292/166 |
| 5,350,213 A | 9/1994 | Bernardo |
| 5,595,076 A * | 1/1997 | Weinerman ............... E05B 5/00 |
| | | 292/34 |
| 6,490,895 B1 * | 12/2002 | Weinerman ............... E05B 5/00 |
| | | 292/166 |
| 6,497,445 B1 | 12/2002 | Combs, II |
| 7,040,675 B1 | 5/2006 | Ott et al. |

(Continued)

FOREIGN PATENT DOCUMENTS

| CN | 106930677 A | 7/2017 |
| WO | 2018076637 A1 | 5/2018 |

OTHER PUBLICATIONS

International Search Report and Written Opinion for PCT/AU2019/050499 dated Aug. 13, 2019 (13 pages).

*Primary Examiner* — Jason S Morrow
(74) *Attorney, Agent, or Firm* — Oakmoore Pty Ltd.

(57) ABSTRACT

A lock system for operation of a roll top cover for covering a cargo bed of a vehicle enables a plurality of locking or engagement points. The system includes: one or more lock assemblies configured to operate a plurality of locking mechanisms for reversibly engaging the cargo bed; and an actuator assembly having an actuator operably connected to the lock assemblies for operation thereof between locked and unlocked positions.

13 Claims, 9 Drawing Sheets

(56) References Cited

U.S. PATENT DOCUMENTS

| | | | | |
|---|---|---|---|---|
| 7,052,071 | B2* | 5/2006 | Mulder | B60J 7/1621 |
| | | | | 296/100.06 |
| 7,261,328 | B2* | 8/2007 | Minix | E05B 13/10 |
| | | | | 292/28 |
| 9,827,839 | B2* | 11/2017 | Williamson | B60J 7/198 |
| 10,286,765 | B2* | 5/2019 | Williamson | B60J 7/198 |
| 11,040,606 | B2* | 6/2021 | Facchinello | E05B 85/10 |
| 11,097,605 | B2* | 8/2021 | Mahler | B62D 33/046 |
| 2005/0284199 | A1 | 12/2005 | Gulley et al. | |
| 2008/0179898 | A1 | 7/2008 | Juga et al. | |
| 2018/0209181 | A1 | 7/2018 | Schroeder et al. | |
| 2021/0122219 | A1* | 4/2021 | Mahler | B60J 7/185 |
| 2021/0268884 | A1* | 9/2021 | Facchinello | E05C 9/043 |

* cited by examiner

LOCK SYSTEM FOR A ROLL COVER

CROSS-REFERENCE TO RELATED APPLICATIONS

This application is a national stage of, and claims priority to, Patent Cooperation Treaty Application No. PCT/AU2019/050499, filed on May 22, 2019, which application claims priority to Australian Patent Application No. AU2018901955, filed on May 31, 2018, which applications are hereby incorporated herein by reference in their entireties.

BACKGROUND

Numerous types of truck bed covers can be arranged over the utility or cargo bed portion of a ute or pickup truck to secure and protect the bed including cargo items disposed therein. In particular, roll top covers generally include a motorized or mechanical drive system for operably covering and uncovering the top of an open cargo bed, truck box or the like by way of an extendable and retractable slat assembly.

Prior art roll top covers can suffer from a number of drawbacks. By way of example, such roll top covers may not be fully weather resistant and/or impervious to moisture and dust, and may not be conveniently and effectively lockable to enable the secure protection of valuables. Additionally, the frictional forces that are produced between the drive chain and the associated drive chain track or rail during operation (i.e., opening and/or closing) of the roll top cover can be significant so as to make closing and/or opening difficult for a user. Further to this, movement or vibration of the slats of the roll top cover can result in the production of undesirable noise during operation of the associated vehicle.

Accordingly, an improved roll top cover that overcomes one or more of the above disadvantages is required.

BRIEF DESCRIPTION OF THE DRAWINGS

To assist in understanding the invention and to enable a person skilled in the art to put the disclosure into practical effect, the disclosure will be described by way of example only with reference to the accompanying drawings, in which:

FIG. 3 is top-down view of the lock system of FIG. 2 with the hand rail being see-through;

DETAILED DESCRIPTION

The disclosure relates to a lock system for inclusion in a roll top cover that is operable between an extended or closed position and a retracted or open position when installed on a cargo bed of a vehicle, such as pickup trucks and utility vehicles. Elements of the disclosure are illustrated in concise outline form in the drawings, showing only those specific details that are necessary to understand the examples of the disclosure, but so as not to provide excessive detail that will be obvious to those of ordinary skill in the art in light of the present description.

In this specification, adjectives such as first and second, top and bottom, upwards and downwards, and the like may be used solely to distinguish one element or action from another element or action without necessarily requiring or implying any actual such relationship or order. Words such as "comprises" or "includes" are intended to define a non-exclusive inclusion, such that a method or apparatus that comprises a list of elements does not include only those elements but may include other elements not expressly listed, including elements that are inherent to such a method or system.

In one aspect, although not necessarily the only aspect or the broadest aspect, the disclosure includes a lock system comprising one or more lock assemblies configured to operate a plurality of locking mechanisms for reversibly engaging the cargo bed; and an actuator assembly having an actuator operably connected to the lock assemblies for operation thereof between locked and unlocked positions.

In one example, the actuator assembly further comprises a lock member to enable said actuator to operate the lock assemblies.

In particular examples, the plurality of locking mechanisms comprise a latch mechanism and a locking bolt mechanism.

Suitably, the actuator is a lever arm configured to actuate the plurality of locking mechanisms upon relative pivotable movement thereof. Preferably, the lever arm is pivotable between the locked position and first and second unlocked positions.

In certain examples, in the first unlocked position, the latch mechanism is configured to pivot to a flexed position so as to disengage the cargo bed; and in the second unlocked position, the locking bolt mechanism is configured to move to a retracted position so as to disengage the cargo bed.

Suitably, the latch mechanism engages an end wall or tailgate of the cargo bed and the locking bolt mechanism engages a side rail of the roll top cover.

In one example, the lock system comprises first and second locking assemblies disposed at respective ends of an overlying slat.

In certain examples, the actuator assembly is disposed within an aperture in the overlying slat and intermediate the first and second locking assemblies.

Suitably, the actuator assembly further comprises a lid hingedly connected thereto for reversibly overlying the aperture.

Suitably, the lock system further comprises a switch assembly disposed intermediate the first and second locking assemblies and operably connected thereto and beneath the overlying slat, the switch assembly configured to operably transfer a pulling force from the actuator assembly to the first and second locking assemblies. Preferably, the switch assembly comprises a rotor rotatably positioned within a support plate, the rotor operably connected to the actuator assembly so as to be rotatable between a first position and a second position thereby. More preferably, the rotor is operably connected to the actuator assembly by a control cable.

In some examples, the rotor is operably connected to the first and second locking assemblies by respective first and second latch cables and first and second locking bolt cables.

Suitably, the switch assembly is configured so that rotation of the rotor in a first direction upon operation of the actuator to an unlocked position causes:

movement of the first latch cable and the first locking bolt cable in the first direction to unlock the first locking assembly; and movement of the second latch cable and second locking bolt cable in the second direction to unlock the second locking assembly.

In one example, the switch assembly further comprises a release handle that allows for manual operation of the lock system from within the cargo bed.

In another aspect, the disclosure includes a roll top cover assembly for operably covering a cargo bed of a vehicle, comprising the lock system of the aforementioned aspect.

Particular advantages of some examples of the lock system include providing a plurality of locking or engagement points, such as on a tail gate and/or one or more side walls, with an associated cargo bed. A further advantage resides in the provision of a lock system having an integrated emergency opening mechanism or system that allows for operation thereof such that the roll top cover can be unlocked from within the cargo bed if required.

Figure 1:
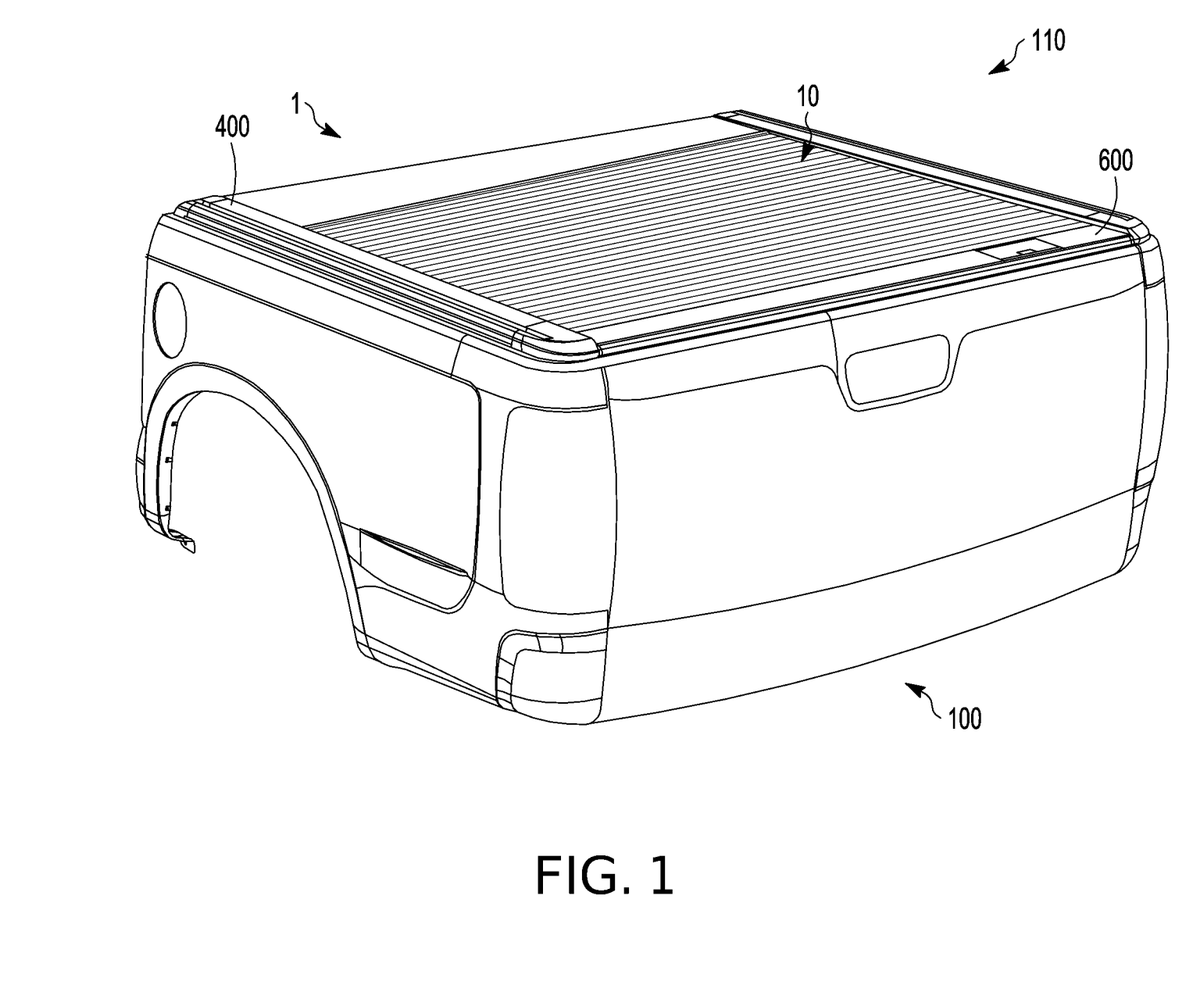
FIG. 1 is a top-down perspective view of a roll top cover suitably installed on a vehicle.
Figure 2:
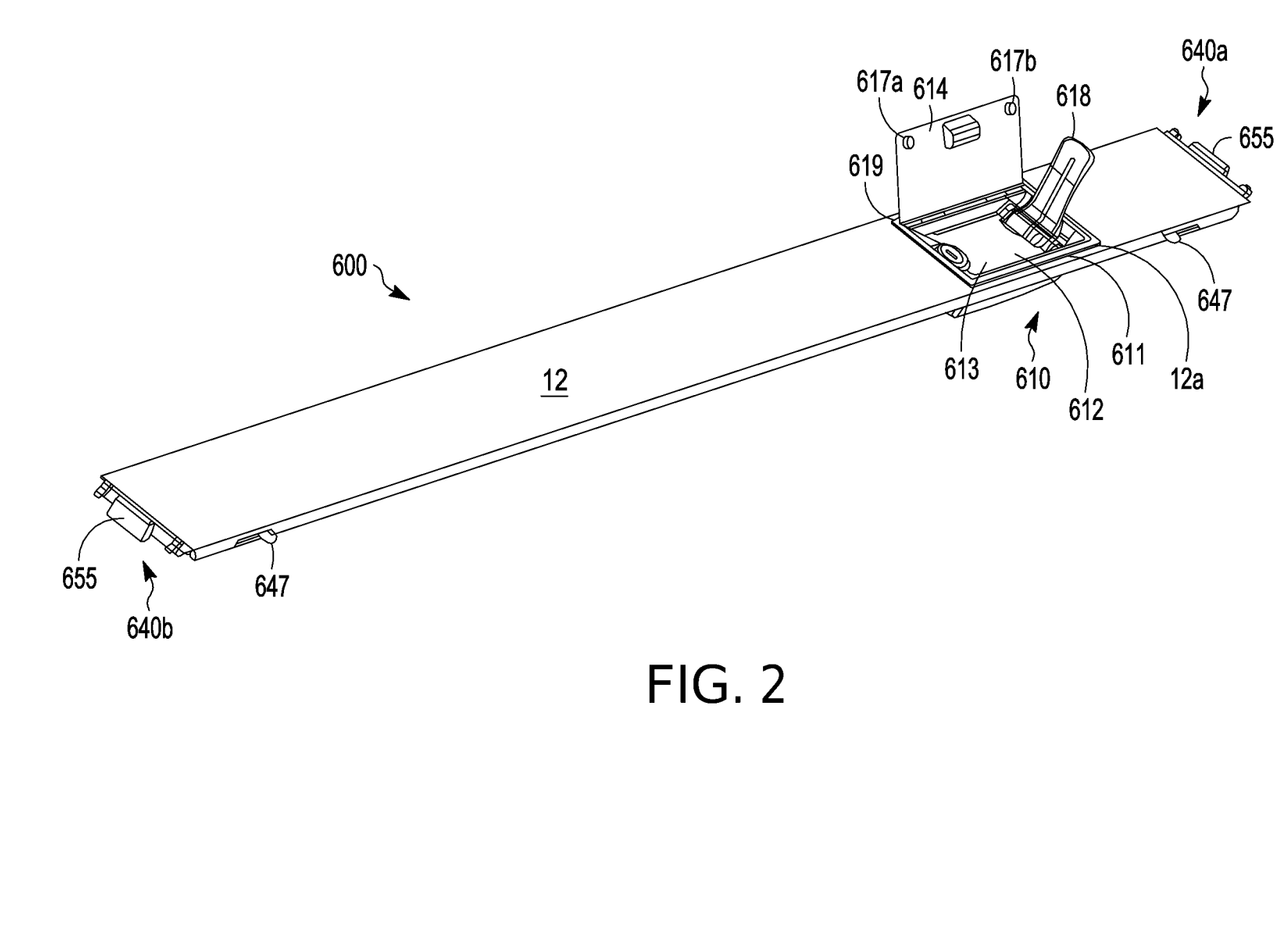
FIG. 2 illustrates a top-down perspective view of a lock system for operation of the roll top cover of FIG. 1 disposed within a hand rail of a slat assembly.
Figure 3:
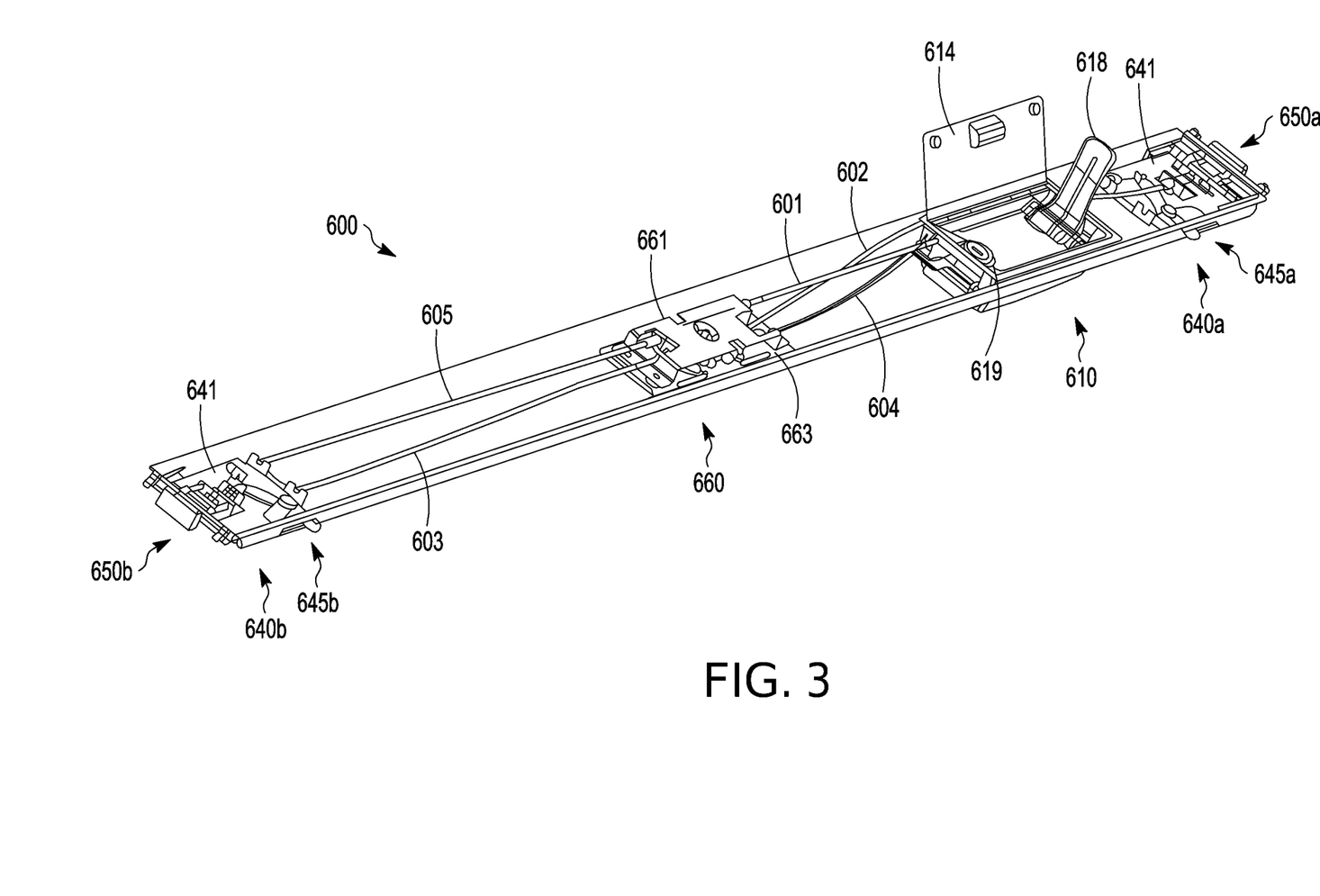
Figure 4:
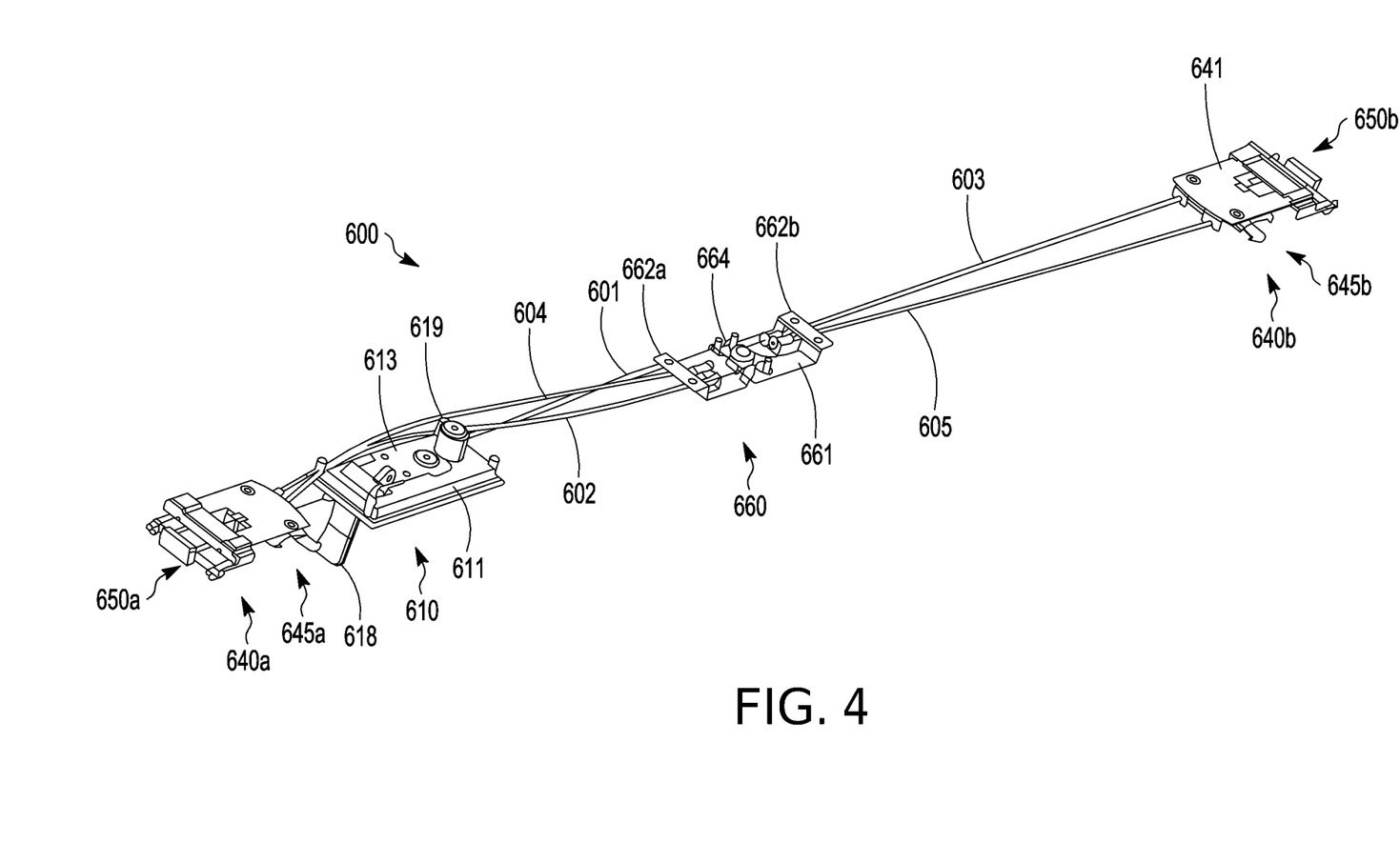
FIG. 4 illustrates a bottom-up perspective view of the lock system of FIG. 2 prior to installation on a vehicle.
Figure 5:
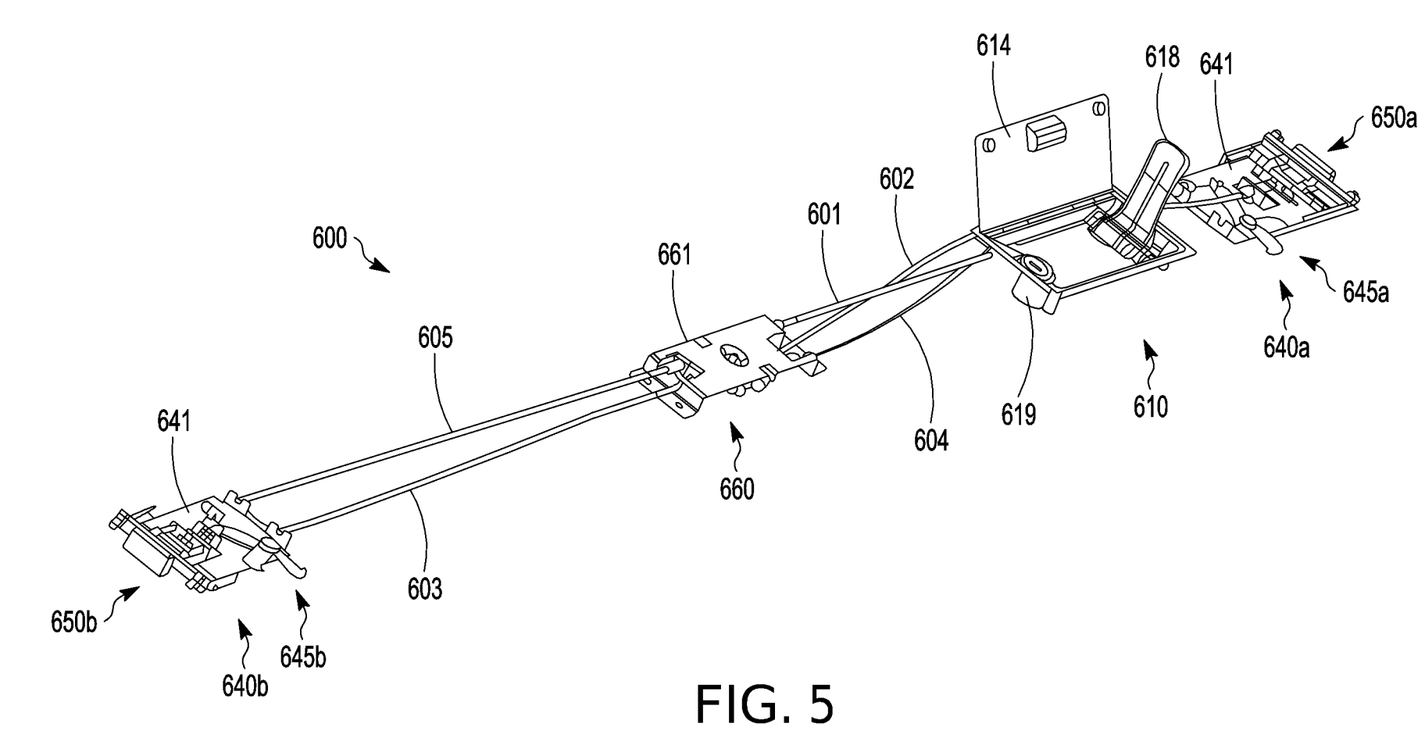
FIG. 5 is a top-down perspective view of the lock system of FIG. 2 prior to installation on a vehicle.

FIGS. 1 to 9 provide a lock system 600. As illustrated in FIG. 1, the lock system 600 is configured for being part of a roll top cover 1 for covering a cargo bed 110 of a vehicle 100. In the example provided, the lock system 600 is disposed at an end portion of an associated slat assembly 10 and in doing so is operable to lock the roll top cover 1 in a closed or extended position, as illustrated in FIG. 1. Once the lock system 600 is unlocked, this allows for slidable movement of the roll top cover 1 to an open or retracted position. The slat assembly 10 is constructed of a plurality of successive and pivotably interconnected slats 11.

In the example provided, the lock system 600 is disposed beneath a hand rail 12 of wider dimensions than the remaining interconnected slats. In this manner, the hand rail 12 provides a cover to prevent access and exposure to the underlying lock system 600. Additionally, the lock system 600 can be securely engaged with respective end portions of the hand rail 12 by way of fasteners (not shown), such as screws and rivets.

The lock system 600 includes an actuator assembly 610 having a housing 611 of a substantially rectangular cross-section and having a recessed container portion 612 with a base wall 613 defining upper and lower surfaces and a lid 614. The housing 611 further includes first and second end walls 615a,b and first and second side walls 616a,b. As can be observed from FIG. 2, the housing 611 is disposed within and below a suitably dimensioned rectangular aperture 12a in the hand rail 12. In this regard, an upper edge or lip of the housing 611 sealingly and securely engages the rectangular aperture substantially therearound.

Figure 6:
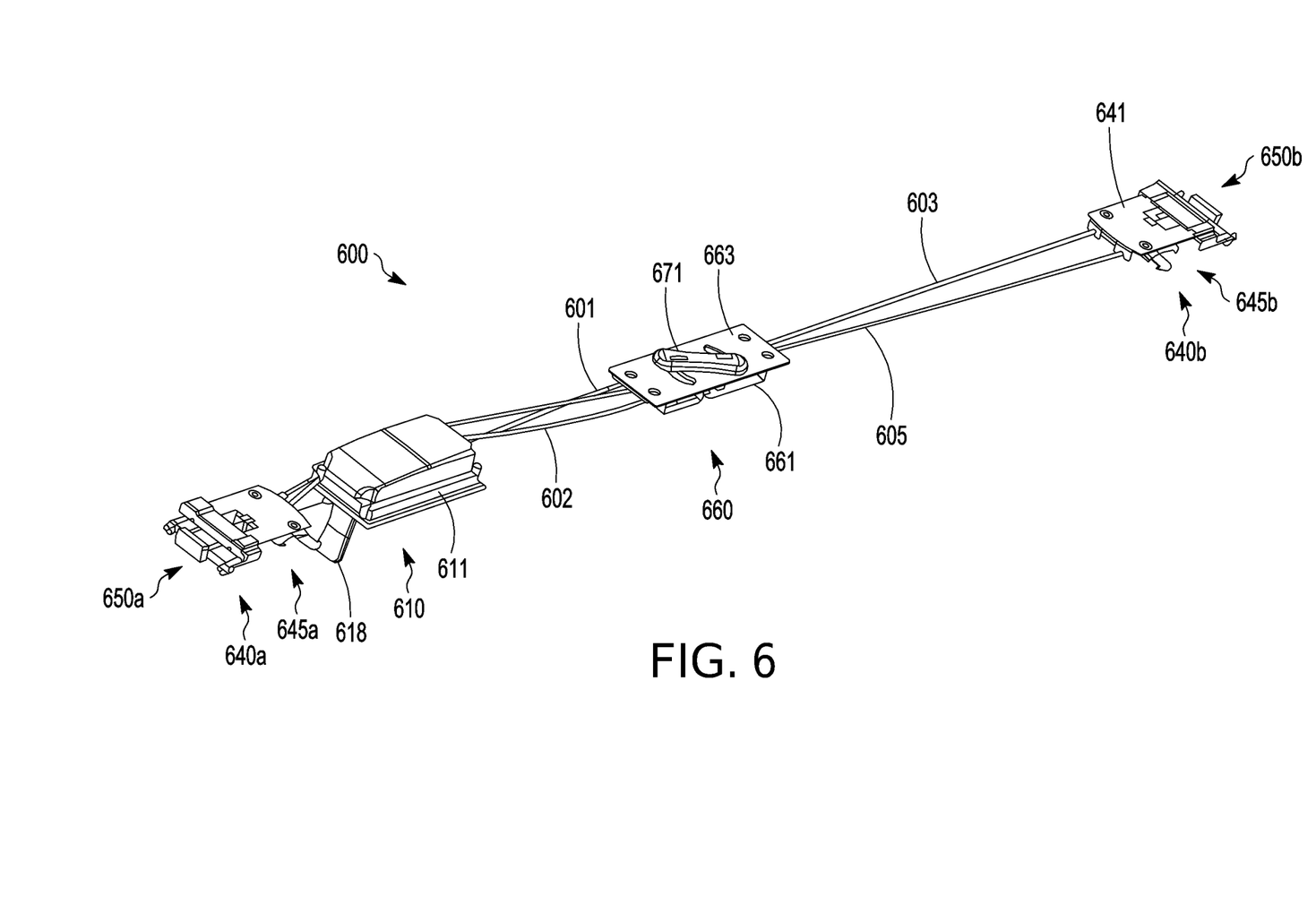
FIG. 6 illustrates a bottom-up perspective view of the lock system of FIG. 2 having an emergency release handle.

The lid 614 is hingedly connected or attached to an upper edge of the container portion 612 so as to be moveable between open and closed positions and thereby allow for access to the underlying container portion 612 by a user. Further to this, the lid 614 when in the closed position is substantially flush with an upper surface of the hand rail 12 which suitably protects the underlying container portion 612 from the ingress of fluid, dust, debris or the like. Disposed in an outer surface of the lid 614 is a recessed portion for being gripped by a user. Mounted on an inner surface of the lid 614 are magnetic elements 617a,b for retaining the lid 614 in a closed position. As shown in FIG. 6, the actuator assembly 610 may further include a removable bottom cover that engages a lower portion of the housing 611.

As illustrated in FIGS. 2 to 7, the actuator assembly 610 includes an elongate handle or lever arm 618 and a cylinder lock 619 disposed in the base wall 613. A base portion of the lever arm 618 is configured to pivotably interact with a first cylindrical element 620 securely disposed at a first end of a support plate 621 and adjacent an end portion of the lower surface of the base wall 613 and the first end wall 615a. The first cylindrical element 620 is operably and rotatably connected to the support plate 621 and facilitates relative pivotal movement of the lever arm 618 about an axis or pivot point between a locked position and first and second unlocked positions.

Projecting distally from the base portion of the lever arm 618 are a pair of triangular-shaped foot portions 618a,b. The foot portions 618a,b are capable of reciprocal arcuate and pivotable movement relative to the base wall 613 upon pivotable movement of the lever arm 618 such that the foot portions 618a,b suitably abut the lower surface of the base wall 613 when the lever arm 618 is in the second unlocked position. In this regard, as the lever arm 618 is pivotally moved between locked and unlocked positions, each of the foot portions 618a,b also moves along a predetermined arcuate path about the pivot point. Opposite the base portion, the lever arm 618 further defines a free end.

Figure 7:
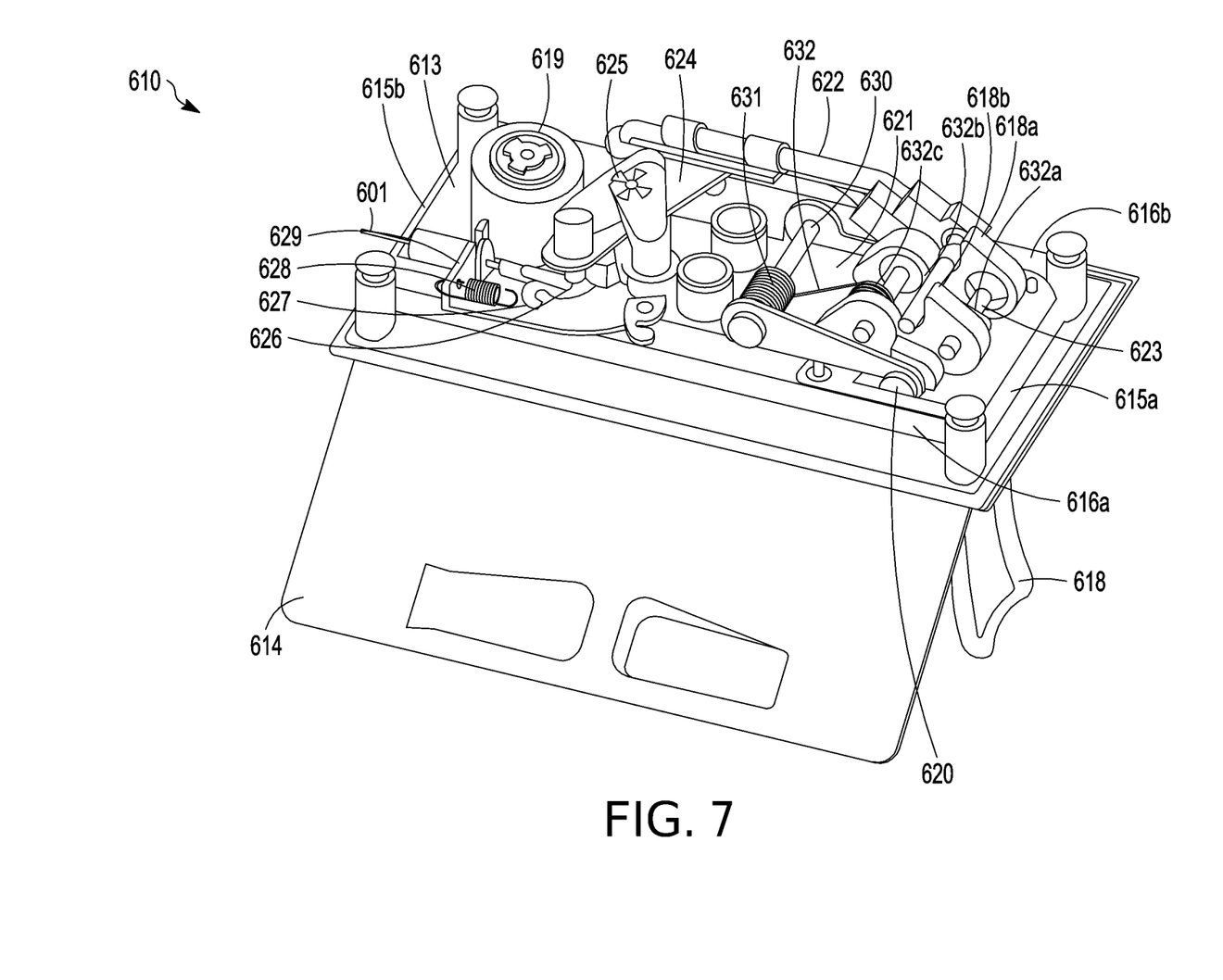
FIG. 7 is a bottom-up and close-up perspective view of an actuator assembly of the lock system of FIG. 2.
Figure 8:
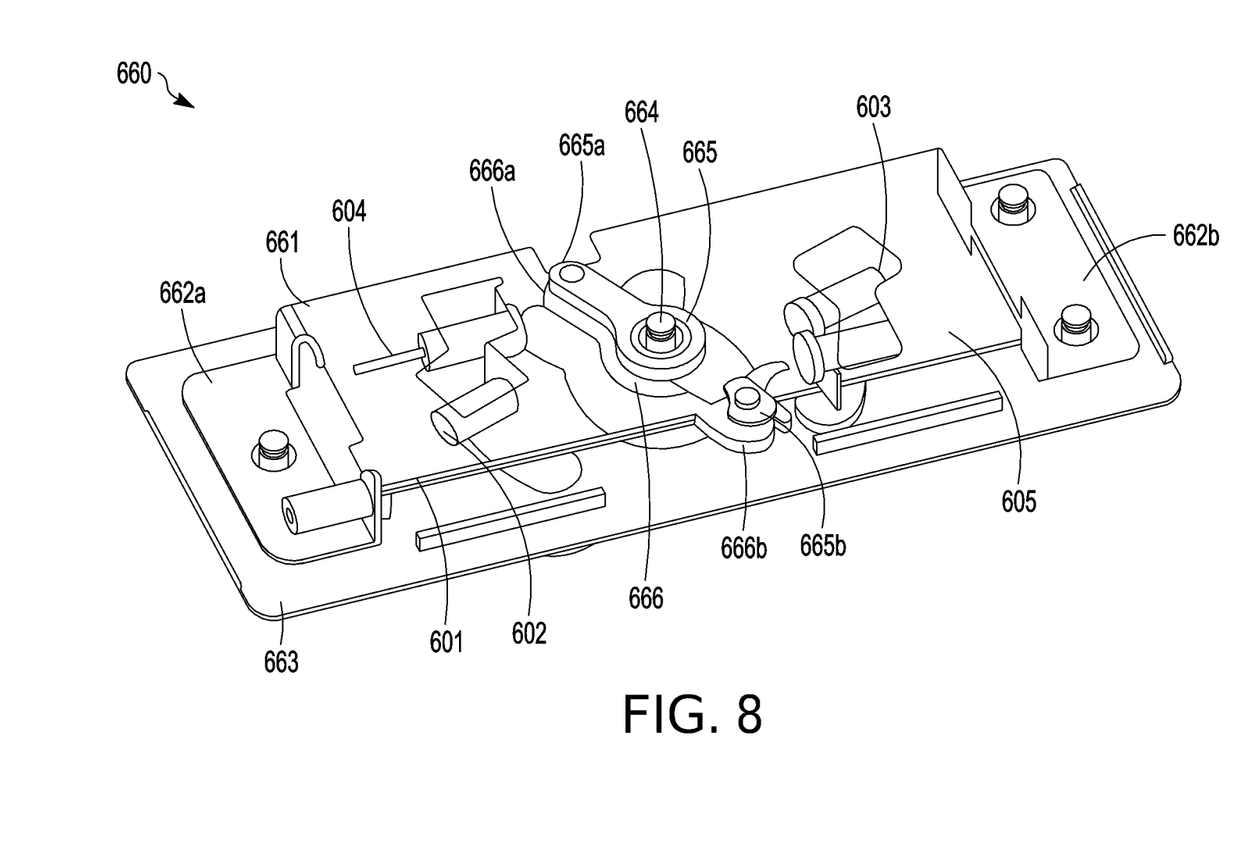
FIG. 8 illustrates an top-down and close-up perspective view of a switch assembly of the lock system of FIG. 2.

As illustrated in FIG. 7, the foot portions 618a,b are operably coupled to a first coupling arm or element 622 by way of a cylindrical joining member 623. The first coupling arm 622 extends from just adjacent the first foot portion 618a to operably engage a proximal end of a second coupling arm 624, which is angularly disposed thereto. The second coupling arm 624 is pivotable or rotatable about a centrally disposed pivot point (not shown). In this regard, a locking element 625 is disposed over and operably connected to the pivot point (not shown), so as to prevent pivotable movement of the second coupling arm 623 when the cylinder lock 619 is locked.

At a distal end of the second coupling arm 623 is disposed an engagement aperture 626 configured to engage a proximal hook element at a first end of an actuating or control wire or cable 660. Further distally from the engagement aperture 626 extends a curved projection 627 which defines a channel therebetween for receiving a first end of a return spring 628. A second end of the return spring 628 is then attached to an aperture in a retaining bracket 629 which extends perpendicularly from a second end of the support plate 621. The retaining bracket 629 further defines a channel portion adjacent the aperture for retaining a cable guide 660a through which extends the control cable 660.

The second end wall 615b includes a cable passageway for receiving the control cable 660 therethrough. In this regard, a first end of the control cable 660 is operably engaged to the lever arm 618 by way of the first and second coupling arms 620, 624, as hereinbefore described. In this manner, upward pivotal movement of the lever arm 618 translates to forward movement of the first coupling arm 620 and corresponding pivotal movement of the second coupling arm 624 to a flexed position, which subsequently pulls the control cable 660 in a first direction towards the first end wall 615a of the housing 611.

Extending transversely across the support plate 621 and securely disposed therein, is a second cylindrical element 630. As can be observed in FIG. 7, disposed around the second cylindrical element 630 is a helical biasing member 631. The helical biasing member 631 having a spring arm 632 which extends radially outward and is biased to contact or abut the joining member 623. In this regard, the spring arm 632 includes first, second and third indents 632*a*-*c* spaced therealong which correspond to the position of the joining member 623 when the lever arm 618 is in the locked position and the first and second unlocked positions respectively. To this end, the indents 632*a*-*c* of the spring arm 632 assist in retaining the lever arm 618 in the respective locked and unlocked positions whilst also providing resistance to a user for movement of the lever arm 618 therebetween.

In the locked position, the lever arm 618 is positioned substantially adjacent or parallel to the upper surface of the base wall 613 of the housing 611 with the free end just adjacent the cylinder lock 619. The lever arm 618 can be locked and retained in this position by the cylinder lock 619, which is operably connected thereto by way of the locking element 625 as previously described, and prevents pivotable movement of the lever arm 618 from the locked position once locked by a user.

Disposed at respective first and second ends of the hand rail 12, are first and second locking assemblies 640*a,b*. Each of the locking assemblies 640*a,b* includes a baseplate 641 on which is mounted respective first and second latch mechanisms 645*a,b* and respective first and second locking block or bolt mechanisms 650*a,b*.

At a lateral or outer end of each of the locking assemblies 640*a,b* is located a recessed step portion 641 that defines a ribbed contact surface for abutting or slidingly contacting a drive channel (not shown) or similar in the side rail 400. Further to this, the lateral end of the locking assemblies 640*a,b* also includes control projections 642 extending laterally and upwardly from either side of an outer end wall so as to respectively prevent or limit side to side and up and down movement of the locking assemblies 640*a,b* within the side rail 400.

Figure 9:
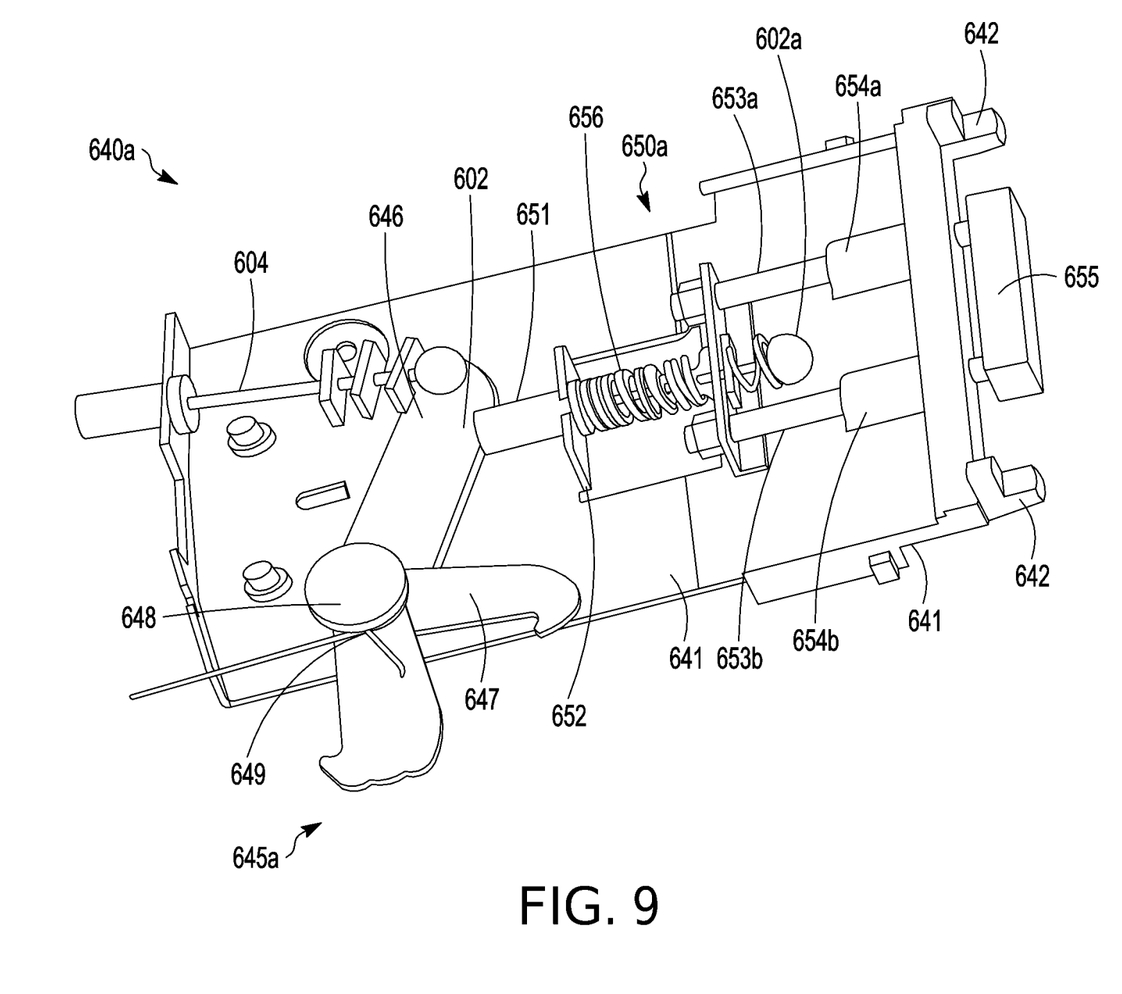
FIG. 9 is a top-down and close-up perspective view of a locking assembly of the lock system of FIG. 2.

As illustrated in FIG. 9, each of the locking bolt mechanisms 650*a,b* includes a cylindrical cable guide 651 for receiving therethrough a second or distal end of respective first and second locking bolt cables 670,675. Each of the locking bolt cables 670,675 then extends through a rectangular mounting plate 652, which is perpendicularly and transversely disposed in relation to the baseplate 641, so as to be operably connected thereto. A pair of parallel and cylindrical support arms 653*a,b* extend perpendicularly from a lateral surface of each mounting plate 652 so as to slidably extend through the respective outer end wall of the baseplate 641 by way of guide elements 654*a,b*. Each pair of the support arms 653*a,b* further engages respective end portions of a locking block or bolt 655, which is positioned adjacent the outer end wall of the baseplate 641 and operable between locked and unlocked positions by respective lateral and medial relative movement of the locking bolt cable 670,675 in first and second directions. In the locked position, the locking bolt 655 extends outward or laterally from the outer end wall of the baseplate 641 to engage a channel or aperture (not shown) in the adjacent side rail 400, whilst in the unlocked position, the locking bolt 655 is retracted medially so as to be directly adjacent or contact the outer end wall of the baseplate 641 and thereby no longer engage the side rail 400.

Disposed around an end portion of each of the locking bolt cables 670,675 is a biasing member 656 that extends from the cable guide 651 to operably engage the mounting plate 652. The second end of each of the locking bolt cables 670,675 terminates in a spherical stop portion 671,676 to retain their respective biasing member 656 thereon. In the example provided, the biasing member 656 is a helical spring, but it is envisaged that this may be one of various types of springs or biasing members as are known in the art. By virtue of this arrangement, the biasing member 656 biases the locking bolt 655 outwards and hence the locking bolt mechanism 650*a,b* into a locked position with respect to the side rail 400.

As illustrated in FIG. 9, the latch mechanisms 645*a,b* each include a pair of elongate latch arms or portions 646,647 pivotably and operably engaged to one another by a fastener 648. A proximal end of each of the first latch arms 646 are operably connected or engaged to a second or distal end of a respective latch cable 604,605 for operation of the latch mechanism 645*a,b* between locked and unlocked positions. A distal end of each of the second latch arms 647 comprise a hooked end portion configured to engage a corresponding and adjacent channel or aperture (not shown) in an inner or medial surface of a tailgate 111 of the vehicle 100.

Each of the latch mechanisms 645*a,b* further includes a further biasing member 649. In the example provided, the further biasing member 649 is a resiliently deformable helical torsion spring, but it will be apparent to the skilled person that alternative biasing members as are known in the art may be used in this regard. Referring to FIG. 9, the respective further biasing members 649 each have a coiled portion, which is respectively mounted onto its respective fastener 648 and thus overlie the pivot point between the latch arms 646,647. A first leg of the further biasing member 649 extends from the coiled portion to engage the first latch arm 646. A second leg similarly extends from the coiled portion to engage the second latch arm 647. As a result of this arrangement, the latch mechanism 645*a,b* is biased to the extended or locked position from the flexed or unlocked position by the further biasing member 649.

Disposed intermediate the first and second locking assemblies 640*a,b* (and intermediate the actuator assembly 610 and the first locking assembly 640*a*) is a switch assembly 660. The switch assembly 660 includes a support plate 661 having opposed end walls and bracket portions 662*a,b* extending perpendicularly therefrom for securely engaging to an underlying cover plate 663.

The switch assembly 660 includes a rotor 664 rotatably engaged or connected to the support plate 661 and the cover plate 663. Operably attached to the rotor 664 is a pair of blades 665,666 disposed sequentially on the rotor 664 by way of a central hub 667, such that they substantially overlie each other. Each of the blades 665,666 further having first and second blade elements 665*a,b*; 666*a,b* extending radially outwardly from the central hub 667 in an opposed manner. Operation of the second blade 666 is independent of the first blade 665 which is operably coupled to actuation of the lever arm 618, the second blade 666 having a rotational delay with respect to rotation of the first blade 665 such that it does not rotate under normal operation of the lock system 600.

Operably connected to respective end portions of the first blade 665 are second ends of the first and second latch cables 604,605, which extend from the first and second latch mechanisms 645*a,b* respectively through a cable guide. Similarly, respective second ends of the first and second locking bolt cables 602,603 extend from respective first and second lock bolt mechanisms 650*a,b* through a cable guide so as to be operably connected to end portions of the first blade 666. The first and second latch cables 604,605 are also operably connected to respective end portions of the second blade 665. Further to this, a second end of the control wire 601 is operably engaged to the first blade 665 so as to pull the rotor 664 in a first direction upon actuation of the lever handle 618.

In the example provided, the blades 665,666 are angularly disposed with respect to the support plate 661 and the cover plate 663 with each respective end thereof adjacent cable guides 667-670 when in the locked position. In the unlocked position, the rotor 664 and the first blade 665 is rotated by way of tension or force from the control wire 601 so as to move away from their adjacent cable supports 667-670. By virtue of this arrangement, rotation of the rotor 664 and associated first blade 665 applies a pulling force to the first latch cable 604 and the first lock cable 602 in a first direction and the second latch cable 605 and the second lock cable 603 in a second direction.

There are two rotors on top of each other one is connected to the emergency handle and is only connected to the latches via the cables (not to the locking bolts).

The emergency handle and related rotor does not rotate under normal operation, as it is independent from the main handle operation so even if the main (outside) handle is locked the emergency handle can be operated.

The emergency handle is locked in position via a cam. The way it works is the emergency handle and related rotor has a rotational "delay" and therefore does not rotate under normal operation.

As can be seen in FIG. 6, the lock system 600 further includes a release handle 671 disposed adjacent an outer surface of the cover plate 663 and operably connected to the second blade 666. The release handle 671 is locked in position via a cam (not shown) and configured so as to be capable of actuating movement of the switch assembly 660 and in particular, the latch mechanisms 645a,b, by way of the second blade 666 and independent of operation of the lever arm 18 and the first blade 665. To this end, the switch assembly 660 can be operated by the release handle 671 even if the lever arm 618 is locked in the locked position.

This arrangement allows for emergency operation (i.e., unlocking) of the lock system 600 (and bypassing of the lever arm 618) by a user if they have locked themselves within the cargo bed 110 of the vehicle 100. As shown in FIG. 6, manually rotating the release handle 671 in an arcuate manner (i.e., an anticlockwise direction) produces the same unlocking effect with respect to the lock system 600 as pivoting the lever arm 618 to the unlocked position. Preferably, this mechanically operated manner of opening the lock system 600 in an emergency overrides any electrically operated components in place.

For operation of the present lock system 600, once the cylinder lock 619 is unlocked by an appropriate key, the lever arm 618 is now free to pivot out of the locked relationship with the base wall 613. The lever arm 618 can then be pivoted upwardly to an unlocked position, which in the example provided is just beyond 90 degrees or perpendicular (i.e., 100 to 110 degrees) relative to the base wall 613. This translates to a pulling force been applied to the control wire 601 which then results in rotation of the rotor 664 and associated blades 665,666 of the switch assembly 660 so as to effectively transfer this pulling force to the latch cables 604,605 and locking bolt cables 602,603 operably connected thereto.

Once a pulling force is applied to the latch cables 604,605 and locking bolt cables 602,603, this results in operation of the respective latch mechanism 645a,b and locking bolt mechanisms 650a,b from the locked to the unlocked position. The lever arm 618 is at the first unlocked position when at an angle of approximately 45 degrees relative to the base wall 613, such that the joining member 623 resides within the second indent 632b of the spring arm 632. Given the rotational delay between the first and second blades 665,666, it is only the latch mechanisms 645a,b that are unlocked (i.e., disengaged from the tailgate) at the first unlocked position, whilst the locking bolt mechanisms 650a,b remain locked. Further rotation of the lever arm 618 to the second unlocked position (i.e., approximately 90 to 110 degrees relative to the base wall 613), now also disengages the locking bolt mechanisms 650a,b from the side rail 400, such that the roll top cover 1 can now be opened or retracted by a user.

It will be appreciated that the present lock system 600 may be electrically and/or remotely operated, such as by the central locking system of the vehicle 100, a push button, a toggle switch, a key fob or any other suitable mechanism known in the art. By way of example, the lever arm 618 can be replaced with a simple lock member that operably overrides electrical actuation of the lock system 600, such as in the event of a malfunction. Preferably, if such an electrical or remote operating system is in place for the lock system 600, then this is overridden by actuation of the release handle 671 by a user so as to allow for opening of the lock system 600 in an emergency.

The above description of various examples of the disclosure is provided for purposes of description to one of ordinary skill in the related art. It is not intended to be exhaustive or to limit the invention to a single disclosed example. As mentioned above, numerous alternatives and variations to the present disclosure will be apparent to those skilled in the art of the above teaching. Accordingly, while some alternative examples have been discussed specifically, other examples will be apparent or relatively easily developed by those of ordinary skill in the art. The disclosure is intended to embrace all alternatives, modifications, and variations of the examples that have been discussed herein, and other examples that fall within the spirit and scope of the disclosure.

The invention claimed is:

1. A lock system for operation of a roll top cover for covering a cargo bed of a vehicle comprising:
   first and second locking assemblies, disposed at respective ends of an overlying slat of the roll top cover, configured to operate a plurality of locking mechanisms for reversibly engaging the cargo bed;
   an actuator assembly having an actuator operably connected to the locking assemblies for operation thereof between locked and unlocked positions; and
   a switch assembly disposed intermediate the first and second locking assemblies and operably connected thereto and beneath the overlying slat, the switch assembly configured to operably transfer a pulling force from the actuator assembly to the first and second locking assemblies;
   wherein the switch assembly comprises a rotor rotatably positioned within a support plate, the rotor operably connected to the actuator assembly so as to be rotatable between a first position and a second position thereby.

2. The lock system of claim 1, wherein the actuator assembly further comprises a lock member to enable said actuator to operate the locking assemblies.

3. The lock system of claim 1, wherein the plurality of locking mechanisms comprise a latch mechanism and a locking bolt mechanism.

4. The lock system of claim 1, wherein the actuator is a lever arm configured to actuate the plurality of locking mechanisms upon relative pivotable movement thereof.

5. The lock system of claim 4, wherein the lever arm is pivotable between the locked position and first and second unlocked positions.

6. The lock system of claim 5, wherein:
- in the first unlocked position, the latch mechanism is configured to pivot to a flexed position so as to disengage the cargo bed;
- in the second unlocked position, the locking bolt mechanism is configured to move to a retracted position so as to disengage the cargo bed.

7. The lock system of claim 3, wherein the latch mechanism engages an end wall or tailgate of the cargo bed and the locking bolt mechanism engages a side rail of the roll top cover.

8. The lock system of claim 1, wherein the actuator assembly is disposed within an aperture in the overlying slat and intermediate the first and second locking assemblies.

9. The lock system of claim 8, wherein the actuator assembly further comprises a lid hingedly connected thereto for reversibly overlying the aperture.

10. The lock system of claim 1, wherein the rotor is operably connected to the actuator assembly by a control cable.

11. The lock system of claim 1, wherein the rotor is operably connected to the first and second locking assemblies by respective first and second latch cables and first and second locking bolt cables.

12. The lock system of claim 11, wherein the switch assembly is configured so that rotation of the rotor in a first direction upon operation of the actuator to an unlocked position causes:
- movement of the first latch cable and the first locking bolt cable in the first direction to unlock the first locking assembly; and
- movement of the second latch cable and second locking bolt cable in the second direction to unlock the second locking assembly.

13. The lock system of claim 1, wherein the switch assembly further comprises a release handle that allows for manual operation of the lock system from within the cargo bed.

* * * * *